US008425053B2

(12) United States Patent
Kimura

(10) Patent No.: US 8,425,053 B2
(45) Date of Patent: Apr. 23, 2013

(54) LIGHTING CONTROL DEVICE AND PROJECTOR

(75) Inventor: Keishi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 477 days.

(21) Appl. No.: 12/700,222

(22) Filed: Feb. 4, 2010

(65) Prior Publication Data

US 2010/0201956 A1 Aug. 12, 2010

(30) Foreign Application Priority Data

Feb. 6, 2009 (JP) ................................. 2009-026748

(51) Int. Cl.
| | |
|---|---|
| G03B 21/20 | (2006.01) |
| G05F 1/00 | (2006.01) |
| H01J 1/60 | (2006.01) |
| H01J 7/42 | (2006.01) |
| H05B 37/02 | (2006.01) |
| H05B 37/04 | (2006.01) |
| H05B 39/04 | (2006.01) |
| H05B 41/36 | (2006.01) |

(52) U.S. Cl.
USPC ............. 353/85; 315/129; 315/133; 315/307; 315/309

(58) Field of Classification Search .................... 353/85, 353/87, 122, 42; 315/129, 133, 291, 307–309, 315/311; 362/253, 276
See application file for complete search history.

(56) References Cited

U.S. PATENT DOCUMENTS

| | | | | |
|---|---|---|---|---|
| 6,448,715 | B1 * | 9/2002 | Fujiwara et al. | 315/129 |
| 6,733,441 | B2 * | 5/2004 | Niida et al. | 600/178 |
| 7,118,224 | B2 * | 10/2006 | Kitada et al. | 353/69 |
| 7,393,110 | B2 * | 7/2008 | Bronstein et al. | 353/85 |
| 7,441,903 | B2 * | 10/2008 | Kim | 353/61 |
| 7,635,952 | B2 | 12/2009 | Takeda et al. | |
| 8,070,297 | B2 * | 12/2011 | Kamijima | 353/69 |
| 2001/0013856 | A1 * | 8/2001 | Hamakada et al. | 345/156 |
| 2002/0047640 | A1 * | 4/2002 | Ito et al. | 315/307 |
| 2006/0008240 | A1 * | 1/2006 | Taft et al. | 386/46 |
| 2006/0170883 | A1 * | 8/2006 | Matsui | 353/85 |
| 2009/0045759 | A1 * | 2/2009 | Kang et al. | 315/307 |
| 2009/0174866 | A1 * | 7/2009 | Okada | 353/52 |

FOREIGN PATENT DOCUMENTS

| | | |
|---|---|---|
| JP | A-2001-250698 | 9/2001 |
| JP | 2007-112237 | 5/2007 |
| JP | A-2007-122996 | 5/2007 |
| JP | A-2008-116810 | 5/2008 |
| JP | A-2008-185619 | 8/2008 |

\* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

A projector includes: a light source; a light modulating device; a projection optical device; a lighting control device configured to control lighting of the light source and include a lighting unit; a control unit includes a storage section, a determination section, an information setting section configured to store problem related information regarding the problem in the storage section, a signal transmission section configured to indicate that the problem has occurred, and a detection unit configured to detect a driving state of the lighting control device; a control device configured to connect with the light control device and includes a main body side storage section, and an information acquisition section configured to acquire the problem related information when the problem occurrence signal is received and stores the problem related information in the main body side storage section.

17 Claims, 3 Drawing Sheets

LIGHTING CONTROL DEVICE AND PROJECTOR

BACKGROUND

1. Technical Field

The present invention relates to a lighting control device which controls the lighting of a light source and a projector including the lighting control device.

2. Related Art

A projector configured to form image light corresponding to the image information by modulating light emitted from a light source and projecting the image light onto a projection surface, such as a screen, in an enlarged manner is known. As such a light source, a discharge type light source lamp, such as an ultrahigh-pressure mercury lamp, is adopted in many cases. The projector includes a lighting control device, which controls the lighting by supplying electric power to the light source lamp, and a control device which controls the entire projector including the lighting control device.

In recent years, as a high function is demanded of a projector, the configuration of the projector is also becoming complicated. Accordingly, since a problem occurring in the projector is also complicated, it is becoming complicated to specify the causes of the problem. For this reason, a projector configured to store and to display the information (problem log information) when a problem occurs has been proposed (for example, refer to JP-A-2008-116810).

The projector disclosed in JP-A-2008-116810 counts the number of times of a problem for every configuration and type when the problem occurs and stores the number of times as problem log information or stores the number of times as log information regarding the temperature (temperature log information) inside the projector when the problem occurs. In addition, the problem log information and the temperature log information are displayed when necessary.

In the projector disclosed in JP-A-2008-116810, it is easy to find where the problem has occurred. However, there is a problem that it is difficult to specify the cause of the problem. For example, a problem in lighting of a light source lamp may be mentioned as a problem occurring in the projector. However, since the lighting control device and the control device generally need to be insulated from each other, it is difficult to perform communication between the lighting control device and the control device all the time. This makes it difficult to specify the problem in lighting of the light source lamp. Many causes including abnormal inside temperature of the lighting control device and the age, defectiveness, and poor contact of the light source lamp may be mentioned as causes of the problem in lighting. For this reason, a configuration capable of easily specifying the cause of a problem has been demanded.

SUMMARY

An advantage of some aspects of the invention is to provide a lighting control device and a projector capable of easily specifying the cause of a problem According to an aspect of the invention, there is provided a projector including: a light source; a light modulating device configured to form image light corresponding to image information by modulating light emitted from the light source; a projection optical device configured to project the image light; a lighting control device configured to control lighting of the light source, and includes a lighting unit configured to supply electric power to the light source; a control unit configured to control the lighting unit, and includes a storage section; a determination section configured to determine whether or not a problem has occurred on the basis of the driving state detected by the detection unit; an information setting section configured to store problem related information regarding the problem in the storage section when the determination section determines that the problem has occurred, and a signal transmission section configured to transmit to the control device a problem occurrence signal, which indicates that the problem has occurred, when the determination section determines that the problem has occurred, and a detection unit configured to detect a driving state of the lighting control device, a control device configured to connect with the light control device, and includes a main body side storage section; and an information acquisition section configured to acquire the problem related information when the problem occurrence signal is received and stores the problem related information in the main body side storage section.

Here, as the light source, not only a discharge type light source lamp, such as an ultrahigh-pressure mercury lamp, may be mentioned but also a solid-state light source, such as an LED (Light Emitting Diode), may be mentioned.

According to the aspect of the invention, when the determination section determines that a problem has occurred on the basis of the driving state of the lighting control device detected by the detection unit, the information setting section stores the problem related information regarding the problem in the storage section. In this case, since the problem related information is acquired by referring to the storage section and the problem related information is analyzed, the cause of a problem occurring in the lighting control device can be easily specified.

According to the aspect of the invention, the same effects as in the lighting control device can be obtained, the cause of a problem occurring in the light source and the lighting control device can be easily specified.

According to the aspect of the invention, when a problem occurrence signal is received, the information acquisition section acquires the problem related information stored in the storage section of the lighting control device and stores the acquired problem related information in the main body side storage section. In this case, the same problem related information can be held in the lighting control device and the control device. Therefore, backup of the information can be realized.

Here, since the lighting control device and the control device generally need to be insulated from each other, it is difficult to perform communication between the lighting control device and the control device all the time. On the other hand, the information acquisition section acquires the problem related information from the lighting control device when a problem occurrence signal is received. Accordingly, communication between the lighting control device and the control device does not need to be performed all the time because it is sufficient to perform communication between the lighting control device and the control device when the control device instructs ON/OFF of the light source and when a problem occurs. As a result, it is possible to form a projector capable of obtaining the above-described effects without a large change in the known configuration.

Moreover, the storage capacity of the main body side storage section included in the control device can be easily made large compared with the storage section of the lighting control device. In addition, by making the storage capacity of the main body side storage section large, the information regarding each problem can be stored in the main body side storage section even when a problem occurs a plural number of times in the lighting control device.

That is, when each of the storage section of the lighting control device and the main body side storage section has a storage capacity capable of storing only the problem related information regarding the one problem, the contents stored in the storage section and the main body side storage section are overwritten whenever a problem occurs in the light source and the lighting control device. As a result, the problem related information regarding the previous problem disappears. On the other hand, if the main body side storage section has a larger storage capacity than that of the storage section and has a storage capacity capable of storing a plurality of items of problem related information, the control device can hold each item of the problem related information even when different problems occur a plural number of times in the lighting control device. As a result, the cause of the problem can be more easily specified, and measures against the problem can be quickly taken.

In the aspect of the invention described above, it is preferable that the information setting section includes a driving information setting section configured to store driving information, which is based on the driving state within a predetermined period until the problem occurs, as the problem related information in the storage section.

Here, the driving state within the predetermined period may be a driving state at a timing immediately before the determination section determines that a problem has occurred, or may be a driving state in a period until it is determined that a problem has occurred from the start of driving of the lighting control device. That is, the predetermined period may be appropriately set according to the storage capacity or the like of the storage section.

In the aspect of the invention, the driving information based on the driving state within the predetermined period until the determination section determines that a problem has occurred is stored as the problem related information in the storage section by the driving information setting section. In this case, the driving state of the lighting control device when a problem occurs can be appropriately checked by referring to the driving information. Therefore, the cause of a problem occurring in the lighting control device can be specified more easily.

In the aspect of the invention described above, preferably, the control unit includes a cause specifying section which specifies a cause of the problem on the basis of the driving state when the determination section determines that the problem has occurred, and the information setting section includes a cause information setting section configured to store cause information, which indicates the specified cause, as the problem related information in the storage section.

In the aspect of the invention, the cause specifying section specifies the cause of the problem on the basis of the detected driving state of the lighting control device, and the cause information setting section stores the cause information indicating the specified cause as the problem related information in the storage section. In this case, the cause of the problem can be quickly checked by referring to the cause information. Accordingly, a time required to specify the cause of a problem can be shortened, and this is more effective when a problem occurs due to an internal factor of the lighting control device.

In the aspect of the invention, it is preferable that the determination section determines whether or not a problem has occurred on the basis of transition of the detected driving state.

Here, for example, when the light source lamp is adopted as the light source and the light source lamp is turned on by an alternating current supplied by the lighting control device, single electrode discharge in which a current flows in only one direction may occur. Such single electrode discharge is not an abnormal event in the start period of the light source lamp (period until arc discharge starts between the tips of a pair of electrodes of the light source lamp). However, in the steady period after the start period (period for which the arc discharge between the tips is stabilized), the single electrode discharge is an abnormal event. Thus, it is necessary to determine whether or not an event, which occurs in the light source and the lighting control device, is a problem on the basis of the transition of the driving state.

On the other hand, in the aspect of the invention, the determination section determines whether or not a problem has occurred on the basis of the transition of the detected driving state of the lighting control device. Accordingly, it can be appropriately determined whether or not an event which occurs is an abnormal event.

In the aspect of the invention described above, it is preferable that the detection unit detects at least one of current and voltage values of the electric power supplied to the light source, inside temperature, and a voltage value of electric power input to the lighting control device.

In the aspect of the invention, it is possible to determine a problem regarding the lighting of the light source, such as the above-described single electrode discharge, by detecting the current value of the electric power supplied to the light source using the detection unit. In addition, contact problem, the age of the light source, and the like can be determined by detecting the voltage value of the electric power using the detection unit. In addition, using the detection unit, abnormal temperature can be determined by detecting the inside temperature of the lighting control device, and overvoltage and the like can be determined by detecting the voltage value of the electric power input to the lighting control device. Accordingly, since it can be appropriately determined whether or not a problem has occurred on the basis of the detection result of the detecting unit, the cause of the problem can be quickly specified and measures against the problem can be quickly taken.

In the aspect of the invention described above, it is preferable to further include a main body side detection unit that detects a driving state of the projector. Moreover, it is preferable that the control device includes a main body side information setting section configured to store main body side driving information based on the driving state, which has been detected by the main body side detection unit within a predetermined period until the problem occurrence signal is received, in the main body side storage section so as to be associated with the problem related information acquired by the information acquisition section when the problem occurrence signal is received.

Similar to the case described above, the driving state within the predetermined period may be a driving state at a timing immediately before a problem occurrence signal is received, or may be a driving state in a period until the problem occurrence signal is received from the start of driving of the projector (after electric power is supplied to the projector). That is, the predetermined period may be appropriately set according to the storage capacity or the like of the main body side storage section.

Moreover, examples of the driving state of the projector include the inside and outside temperatures of the projector, a driving state of the cooling device for cooling the components of the projector, and the voltage value of commercial power further input from the outside of the projector.

For example, in the case where the inside temperature of the lighting control device is considered as the cause of the problem, if the driving of the cooling device is not performed appropriately, the essential cause of the problem may be a problem in the driving of the cooling device. In such a case, in the aspect of the invention, the main body side information setting section stores the main body side driving information, which is based on the driving state of the projector within the predetermined period until the problem occurrence signal is received, in the main body side storage section so as to be associated with the problem related information acquired by the information acquisition section. In this case, the states of the projector and lighting control device when a problem occurs in the light source and the lighting control device can be easily checked by referring to the contents stored in the main body side storage section. Therefore, the essential cause of the problem can be easily specified, and the information which is useful for the design of the projector can also be obtained.

In the aspect of the invention described above, it is preferable that the control device includes a transmission section configured to transmit the acquired problem related information to an external apparatus connected to the projector.

Here, examples of the external apparatus include a USB memory, which is connected to the projector through a USB (Universal Serial Bus), and a PC (Personal Computer). In addition, when a PC is connected to the projector, the PC may be connected through a LAN (Local Area Network) or a connection terminal, such as an RS-232 (Recommended Standard 232) terminal. Moreover, the USB connection and the LAN connection may be performed by cable or wirelessly. In addition, the transmission of information to the external apparatus may be performed at a timing when the information is acquired by the information acquisition section or may be performed at a timing when a user or the like performs a predetermined operation.

In the aspect of the invention, since the acquired problem related information is transmitted to the external apparatus by the transmission section, the problem caused can be easily analyzed on the basis of the transmitted problem related information. In addition, the projector may be used in a state of being fixed at the installation place, such as the ceiling. In this case, it requires a complicated work to detach the projector from the installation place. On the other hand, in the aspect of the invention, since the problem related information is transmitted to the external apparatus connected to the projector, the problem related information can be easily extracted. Accordingly, since the problem can be analyzed using the external apparatus, the cause analysis processing can be performed more easily.

In the aspect of the invention described above, it is preferable to further include a reporting unit that reports the acquired problem related information.

Examples of the reporting unit include a display unit that displays the information, a sound output unit that performs the reporting by sound, and a printing unit. Moreover, as the display unit, a display unit that is formed by a liquid crystal panel or the like and can be observed from the outside of the projector may be mentioned. In addition, if the driving of a light source is possible, the light source, a light modulating device, and a projection optical device may also be used as the display unit.

In addition, similar to the transmission of information to the external apparatus, the reporting of the reporting unit may be performed at a timing when the problem related information is acquired or may be performed at a timing when a user or the like performs a predetermined operation.

In the aspect of the invention, since the problem related information regarding the problem caused is reported, the cause of the problem can be easily specified and analyzed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Configuration of a Projector

Hereinafter, an embodiment of the invention will be described with reference to the accompanying drawings.

Figure 1:
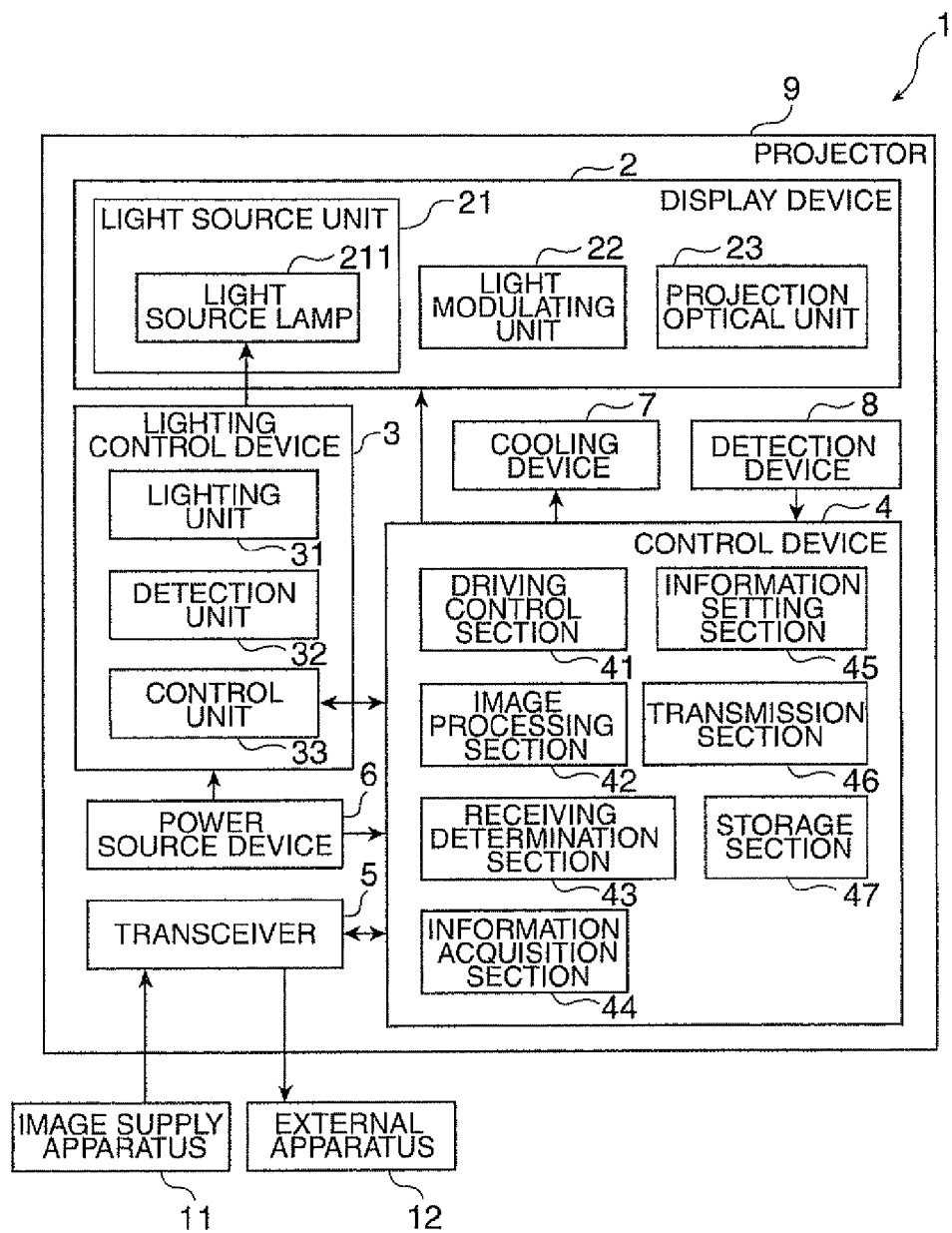
FIG. 1 is a block diagram showing the configuration of a projector according to an embodiment of the invention.

FIG. 1 is a block diagram showing the configuration of a projector 1 according to the present embodiment.

The projector 1 according to the present embodiment forms image light corresponding to the image information by modulating light emitted from a light source and projecting the image light onto a projection surface, such as a screen, in an enlarged manner. As shown in FIG. 1, the projector 1 includes a display device 2, a lighting control device 3, a control device 4, a transceiver 5, a power source device 6, a cooling device 7, a detection device 8, and a housing 9 which houses them therein.

Configuration of a Display Device

Among those described above, the display device also serves as a reporting unit in the invention and forms and projects image light corresponding to a driving signal input from the control device 4 which will be described later. The display device 2 includes a light source unit 21, a light modulating unit 22, and a projection optical unit 23.

The light source unit 21 includes a light source lamp 211 as a light source in the invention and a reflector (not shown) which reflects light emitted from the light source lamp 211. A connector (not shown) provided in the light source lamp 211 is connected to the lighting control device 3, and the light source lamp 211 is lighted by lamp power supplied from the lighting control device 3.

The light modulating unit 22 includes a liquid crystal panel, which forms image light by modulating light emitted from the light source unit 21, and a driver which drives the liquid crystal panel according to an input driving signal. In addition, the light modulating unit 22 is not limited to having the configuration including a liquid crystal panel. For example, a configuration not including a liquid crystal panel, such as a device using a micromirror, may also be adopted.

The projection optical unit 23 projects the formed image light onto a projection surface in an enlarged manner, and includes a lens barrel and a group of lenses which include a plurality of lenses housed in the lens barrel.

Configuration of a Transceiver

The transceiver 5 includes a plurality of terminals exposed to the outside of the housing 9, and mediates the communication of data and signals between an external apparatus connected through the terminal and the control device 4. Examples of such terminals include not only image terminals, such as a DVI (Digital Visual Interface) terminal and a HDMI (High-Definition Multimedia Interface) terminal, but also a USB (Universal Serial Bus) terminal and a LAN (Local Area Network) terminal. In addition, an image supply apparatus 11, such as a PC, is connected to the image terminal, and an external apparatus 12 is connected to the USE terminal.

Configuration of a Power Source Device

The power source device 6 supplies electric power, which is supplied from the outside through a power cable, to the components of the projector 1. Although not shown, the power source device 6 is divided into a primary side power supply system which converts an input commercial alternating current into a direct current and a secondary side power supply system which transforms the electric power, which has been DC-converted by the primary side power supply system, according to a component of a supply destination. In addition, the lighting control device 3 which will be described later is connected to the primary side power supply system.

Configuration of a Cooling Device

The cooling device 7 cools the components of the projector 1. The cooling device 7 is formed by a plurality of fans. The cooling device 7 sends to each component the cooling air sucked from the outside of the projector 1 and discharges the cooling air, which is heated after being supplied for the cooling of each component, to the outside.

Configuration of a Detection Device

The detection device 8 is equivalent to a main body side detection unit in the invention and detects a driving state of the projector 1. Specifically, the detection device 8 includes a plurality of sensors. Using these sensors, the detection device 8 measures the temperature of the outside of the housing 9 and the temperatures of a plurality of places in the housing 9 or measures the rotation speed of each of the fans, which form the cooling device 7, and the voltage of commercial power input to the power source device 6. The detection device 8 is connected to the control device 4, which will be described later, and outputs a detection result to the control device 4.

Configuration of a Lighting Control Device

The lighting control device 3 is a light source driving circuit for supplying electric power to the light source lamp 211 with a stable voltage. The lighting control device 3 includes a lighting unit 31 that supplies to the light source lamp 211 a current supplied from the primary side power supply system, a detection unit 32 that detects the driving state of the lighting control device 3, and a control unit 33 that controls driving of the lighting control device 3.

Configuration of a Lighting Unit

Although not shown in detail, the lighting unit 31 includes a down converter, an inverter bridge, and an igniter circuit in order in which a current supplied from the power source device 6 flows. In addition, the driving of the lighting unit 31 is controlled by an electric signal input from the control unit 33 (for example, a voltage signal which is input to the down converter and determines the voltage level and a pulse signal input to the inverter bridge).

Among those described above, the down converter removes high-frequency noise and steps down and rectifies the supplied direct current. Specifically, the down converter steps down the direct current, which is input at approximately 300 to 400 V, to approximately 50 to 150 V suitable for the lighting of the light source lamp 211. The down converter includes a coil element and a diode, which are connected in series, and a transistor and a capacitor which branch from the above circuit elements and are connected thereto.

The inverter bridge converts the direct current into an alternating rectangular wave current. The inverter bridge is a bridge circuit including two pairs of transistors, that is, a total of four transistors. When the DC current rectified by the down converter is supplied to the bridge circuit and a pulse signal is applied to each transistor, a path including one of the pairs of transistors and a path including the other pair of transistors are alternately connected. As a result, an alternating rectangular wave current flows to one pair of electrodes of the light source lamp 211.

The igniter circuit is formed as a circuit configured to prompt the start of the light source lamp 211 by performing dielectric breakdown between electrodes of the light source lamp 211.

The igniter circuit includes a high-voltage pulse generating circuit and a pulse transformer which has a primary side connected to the high-voltage pulse generating circuit. The igniter circuit boosts a high-voltage pulse, which is generated by the high-voltage pulse generating circuit, at the secondary side of the pulse transformer and supplies the boosted power to the light source lamp 211. Then, dielectric breakdown between the electrodes of the light source lamp 211 is performed, and the electrodes of the light source lamp 211 are electrically connected to each other. As a result, the lighting of the light source lamp 211 is started.

Configuration of a Detection Unit

The detection unit 32 includes a plurality of sensors and outputs to the control unit 33 a driving state of the lighting control device 3 detected by each of the sensors. As the sensors, the detection unit 32 includes temperature sensors provided at a plurality of places in the lighting control device 3, a voltage sensor which detects the voltage value of electric power input from the power source device 6 to the lighting control device 3, and a current sensor and a voltage sensor which detect the current and voltage values of lamp power supplied to the light source lamp 211.

Configuration of a Control Unit

Figure 2:
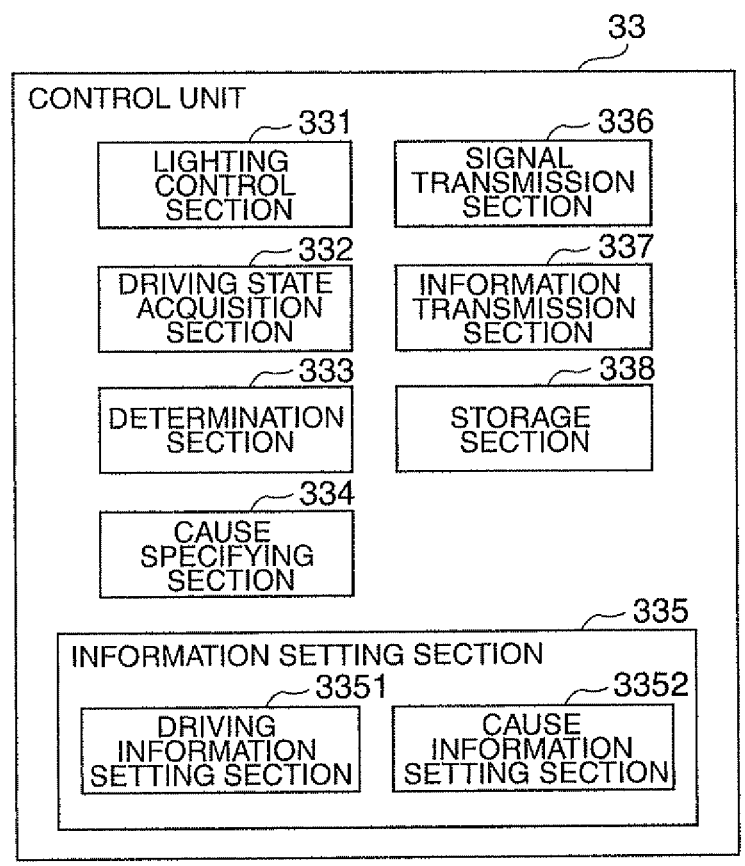
FIG. 2 is a block diagram showing the configuration of a control unit in the embodiment.

FIG. 2 is a block diagram showing the configuration of a control unit.

The control unit 33 controls driving of the lighting unit 31 on the basis of the detection result of the detection unit 32, thereby controlling the lighting of the light source lamp 211. In addition, the control unit 33 determines whether or not a problem has occurred in the light source lamp 211 and the lighting control device 3. When it is determined that a problem has occurred, the control unit 33 stores the driving information and the cause information and transmits the information to the control device 4 which will be described later.

As shown in FIG. 2, the control unit 33 includes a lighting control section 331, a driving state acquisition section 332, a determination section 333, a cause specifying section 334, an information setting section 335, a signal transmission section 336, an information transmission section 337, and a storage section 338.

Among those described above, the storage section 338 is formed by a nonvolatile memory and stores various kinds of programs and data required for the operation of the control unit 33. In addition, the storage section 338 stores problem related information (driving information and cause information) set by the information setting section 335. Accordingly, for example, even when supply of electric power from the power source device 6 is stopped due to a problem or the like or when the lighting control device 3 is detached from the projector 1, the problem related information can be acquired from the storage section 338 because the problem related information stored in the storage section 338 is still held.

The lighting control section 331 controls driving of the lighting unit 31. Specifically, the lighting control section 331 turns on the light source lamp 211 by driving the lighting unit 31 by outputting the above-described voltage signal and pulse signal. In addition, when the determination section 333 determines that a problem has occurred, the lighting control section 331 makes the lighting unit 31 turn off the light source lamp 211.

The driving state acquisition section 332 acquires the information (information indicating the driving state of the lighting control device 3) from the detection unit 32. Here, when acquiring the current and voltage values of lamp power, the driving state acquisition section 332 acquires a plurality of (for example, ten) samples within the latest predetermined period from the current and voltage values detected by the detection unit 32, and stores them as the detected current and voltage values. In addition, the same is true for the inside temperature and the input voltage.

The determination section 333 determines whether or not a problem has occurred in the light source lamp 211 and the lighting control device 3 on the basis of the information acquired by the driving state acquisition section 332. The determination section 333 determines whether or not a problem has occurred on the basis of the transition of the driving state of the light source lamp 211 and the lighting control device 3.

For example, on the basis of the current value of the lamp current detected by the detection unit 32, the determination section 333 changes the conditions of the problem determination according to which of a start period (period until arc discharge starts between tips of a pair of electrodes, which forms the light source lamp 211, after dielectric breakdown between the electrodes) of the light source lamp 211, a rising period (period required for stabilizing the arc discharge), and a steady period (period for which the arc discharge is stabilized) the state at the time of determination corresponds.

Specifically, when a state (state where discharge at both electrodes is stopped) where a current does not flow through each electrode has been detected, the determination section 333 determines that a problem has occurred if the above state continues for 3 seconds or more in the start period and determines that a problem has occurred if the above state continues for 1 second or more in the rising and steady periods.

Moreover, when a state (single electrode discharge state) where a current flows only from one electrode to the other electrode has been detected, the determination section 333 does not determine that a problem has occurred in the start and rising periods and determines that a problem has occurred if the above state continues for 10 seconds or more in the steady period.

Moreover, when an overcurrent has been detected, the determination section 333 does not determine that a problem has occurred in the start period and determines that a problem has occurred if the above state continues for 1 second or more in the rising and steady periods.

In addition, the above duration time used when determining whether or not a problem has occurred may be appropriately set, and the conditions of the problem determination may be appropriately set.

The cause specifying section 334 specifies the cause of the problem when the determination section 333 determines that the problem has occurred. For example, when the determination section 333 determines that a problem has occurred because a single electrode discharge state continued for 10 seconds or more in the steady state, the cause specifying section 334 specifies the single electrode discharge as the cause of the problem.

The information setting section 335 stores the problem related information related to a problem in the storage section 338 when the determination section 333 determines that the problem has occurred. The information setting section 335 includes a driving information setting section 3351 and a cause information setting section 3352. The problem related information is information including the driving information set by the driving information setting section 3351 and the cause information which is set by the cause information setting section 3352 so as to be associated with the driving information.

The driving information setting section 3351 stores the information regarding the detection result of the detection unit 32, which was used in the determination of the determination section 333, in the storage section 338 as driving information when a problem occurs. That is, the driving information is information based on the driving state of the lighting control device which is detected by the detection unit 32 within a predetermined period until it is determined that a problem has occurred and is acquired by the driving state acquisition section 332.

The cause information setting section 3352 stores the cause information, which indicates the cause specified by the cause specifying section 334, and the driving information, which has been set by the driving information setting section 3351, in the storage section 338 so as to be associated with each other.

The signal transmission section 336 transmits a problem occurrence signal, which indicates that a problem has occurred, to the control device 4, which will be described later, when the determination section 333 determines that a problem has occurred. The signal transmission of the signal transmission section 336 is executed together with OFF (OFF at the time of the problem) of the light source lamp 211 performed by the lighting control section 331 when it is determined that a problem has occurred. For this reason, two meanings, that is, the occurrence of a problem and OFF of the light source lamp 211 caused by the occurrence of the problem are included in the problem occurrence signal.

The information transmission section 337 transmits the problem related information stored in the storage section 338 to the control device 4 in response to a request signal, which will be described later, from the control device 4.

Configuration of a Control Device

Referring back to FIG. 1, the control device 4 is formed as a circuit board on which a CPU (Central Processing unit) and the like are mounted, is driven by electric power supplied from the secondary side power supply system of the power source device 6, and controls the entire projector 1 including the lighting control device 3. The lighting control device 3 and the control device 4 are connected to each other on the basis of an asynchronous communication method. In the present embodiment, the lighting control device 3 and the control device 4 are connected to each other using UART (Universal Asynchronous Receiver-Transmitter). That is, the communication between the lighting control device 3 and the control device 4 is insulated communication.

The control device 4 includes a driving control section 41, an image processing section 42, a receiving determination section 43, an information acquisition section 44, an information setting section 45, a transmission section 46, and a storage section 47.

Among those described above, the storage section is equivalent to a main body side storage section in the invention and includes a ROM (Read Only Memory) and a RAM (Random Access Memory). The storage section 47 stores various kinds of programs and data required for processing in the control device 4. In addition, the storage section 47 includes a flash memory which is a nonvolatile memory for storing the problem related information acquired by the information acquisition section 44 and the main body side driving information, which is detected by the detection device 8 and acquired by the information setting section 45, so as to be associated with each other. Accordingly, the problem related information and the main body side driving information stored in the storage section 47 are still held in the storage section 47 even when the power source of the projector 1 is turned off. In addition, the flash memory has a storage region where the problem related information and the main body side driving information corresponding to problems occurring a plural number of times can be stored.

The driving control section 41 controls an operation of the entire projector 1 autonomously on the basis of the detection result input from the detection device 8 or executes processing corresponding to a user's operation. For example, the driving control section 41 turns on and off the light source lamp 211 by transmitting to the lighting control device 3 a signal for turning on and off the light source lamp 211. In addition, the driving control section 41 supplies driving power to each fan, which forms the cooling device 7, and rotates each fan at the rotation speed corresponding to the driving power so that the components in the projector 1 can be cooled.

The image processing section 42 processes the image information, such as an image signal and image data, received from an external apparatus (for example, the image supply apparatus 11) through the transceiver 5 and forms an image corresponding to the image information on a VRAM (video RAM) (not shown). In this case, the image processing section 42 corrects the formed image as necessary. Then, the image processing section 42 outputs a driving signal corresponding to the formed image to the display device 2.

In addition, when an operation of displaying the problem related information is performed by a user, the image processing section 42 forms an image including the problem related information stored in the storage section and the main body side driving information (driving information of the projector 1), which will be described, and outputs a driving signal corresponding to the image to the display device 2. As a result, the image is displayed on the display device 2. That is, the image processing section 42 forms the reporting unit in the invention together with the display device 2.

The receiving determination section 43 determines whether or not a problem occurrence signal has been received from the lighting control device 3.

The information acquisition section 44 transmits a request signal, which requests the problem related information, to the lighting control device 3 when the receiving determination section 43 determines that a problem occurrence signal has been received. In addition, the information acquisition section 44 acquires the problem related information received by the request signal and stores the acquired problem related information in the storage section 47.

The information setting section 45 is equivalent to a main body side information setting section in the invention, and acquires the driving state of the projector 1 detected by the detection device 8 and stores the driving state in the storage section 47. When the receiving determination section 43 determines that a problem occurrence signal has been received, the information setting section 45 acquires the driving state detected within a predetermined period until the problem occurrence signal is received. In addition, the information setting section 45 stores the driving information (main body side driving information) based on the driving state in the storage section 47 so as to be associated with the problem related information acquired by the information acquisition section 44.

The transmission section 46 transmits the problem related information and the main body side driving information, which are stored in the storage section 47, to the external apparatus 12 (for example, a PC or a USB memory) connected to the transceiver 5.

Specifically, in the case where the PC as the external apparatus 12 is connected, when a command which requests the corresponding information is input from the PC, the transmission section 46 transmits the information to the PC.

Moreover, when a USB memory is connected as the external apparatus 12 and an auto run program, which acquires the problem related information and the main body side driving information and stores them in a storage region of the USB memory, is stored in the storage region, the transmission section 46 reads and executes the auto run program and stores the problem related information and the main body side driving information in the USB memory.

Information Acquisition Processing

Figure 3:
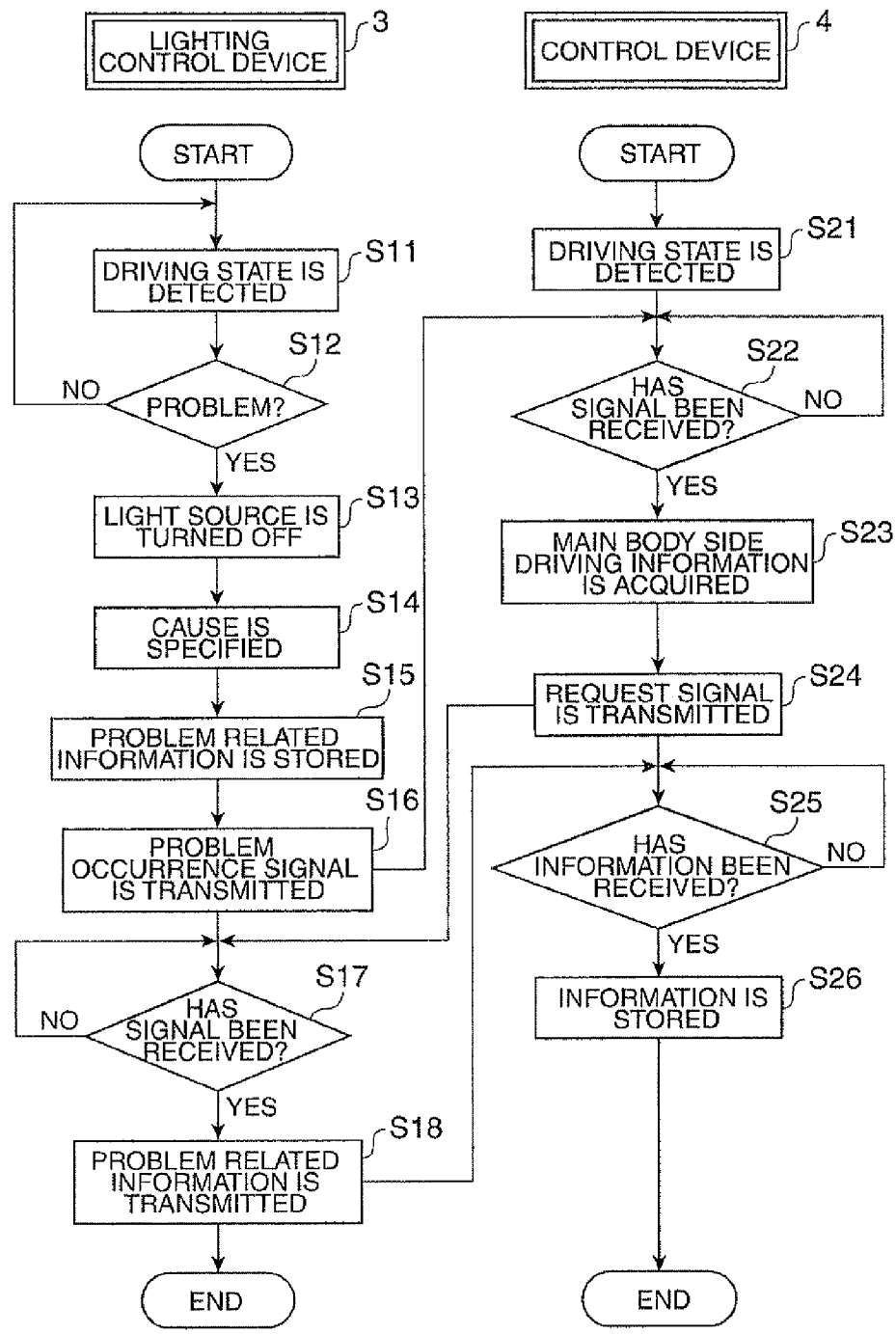
FIG. 3 is a flow chart showing the information acquisition processing in the embodiment.

FIG. 3 is a flow chart showing the image acquisition processing executed by the lighting control device 3 and the control device 4.

The lighting control device 3 and the control device 4 perform the information acquisition processing shown below by the above-described configuration. That is, the lighting control device 3 stores the problem related information, and the control device 4 stores the problem related information and the main body side driving information. This information acquisition processing is executed when power is supplied to the projector 1.

Specifically, in the information acquisition processing of the lighting control device 3, as shown in FIG. 3, the detection unit 32 detects the driving state of the entire lighting control device 3 and the driving state acquisition section 332 acquires a detection result (driving state) of the detection unit 32 (step S11).

Then, the determination section 333 determines whether or not a problem has occurred on the basis of the acquired detection result (step S12). Here, if the determination section 333 determines that a problem has not occurred, the lighting control device 3 returns to step S11.

On the other hand, if the determination section 333 determines that a problem has occurred, the lighting control section 331 turns off the light source lamp 211 (step S13) and the cause specifying section 334 specifies the cause of the problem on the basis of the detected driving state of the lighting control device 3 (step S14).

Then, the driving information setting section 3351 of the information setting section 335 stores in the storage section 338 the driving information based on the driving state of the lighting control device 3, which is detected within a predetermined period until it is determined that the problem has occurred, and the cause information setting section 3352 stores the cause information, which indicates the specified cause, in the storage section 338 so as to be associated with the driving information (step S15).

Then, the signal transmission section 336 transmits to the control device 4 a problem occurrence signal indicating that a problem has occurred and the light source lamp 211 has been turned off (step S16).

Then, the lighting control device 3 moves the processing to step S17.

On the other hand, in the control device 4, the detection device 8 detects the driving state of the entire projector 1 (step S21), and the driving control section 41 controls the entire projector 1 on the basis of the detection result of each sensor. In this case, the information setting section 45 acquires the detection result and stores it in the storage section 47.

Then, the receiving determination section 43 determines whether or not a problem occurrence signal has been received from the lighting control device 3 (step S22). In addition, if it is determined that a problem occurrence signal has not been received, the receiving determination section 43 continues the determination on whether or not a problem occurrence signal has been received.

Here, if the receiving determination section 43 determines that a problem occurrence signal has been received, the information setting section 45 acquires and holds the driving information based on the driving state of the projector 1, which has been detected by the detection device 8 within a predetermined period until it is determined that the signal has been received, as main body side driving information (step S23).

Then, the information acquisition section 44 transmits a request signal, which requests the problem related information, to the lighting control device 3 (step S24).

Then, the control device 4 moves the processing to step S25.

In step S17, the information transmission section 337 of the lighting control device 3 determines whether or not a request signal has been received from the control device 4 (step S17). If it is determined that a request signal has not been received, the information transmission section 337 continues the determination on whether or not the signal has been received.

Here, if it is determined that a request signal has been received, the information transmission section 337 transmits the problem related information stored in the storage section 338 to the control device 4 (step S18).

Then, the information acquisition processing in the lighting control device 3 ends.

On the other hand, in step S25, the information acquisition section 44 determines whether or not the problem related information has been received (step S25). If it is determined that the problem related information has not been received, the information acquisition section 44 continues the determination on whether or not the information has been received.

Here, if it is determined that the problem related information has been received, the information acquisition section 44 stores the received problem related information in the storage section 47. In this case, the information setting section 45 stores the main body side driving information acquired in step S23 in the storage section 47 so as to be associated with the problem related information (step S26).

Then, the information acquisition processing in the control device 4 ends.

In addition, the problem related information and the main body side driving information stored in the storage section 47 are transmitted to the external apparatus 12, which is connected to the transceiver 5, by the transmission section 46 as described above, and a report image including the above information is generated by the image processing section 42 by performing a predetermined operation on the projector 1 and the report image is displayed on the display device 2.

The projector 1 according to the present embodiment described above has the following effects.

When the determination section 333 determines that a problem has occurred on the basis of the driving state of the lighting control device 3 detected by the detection unit 32, the information setting section 335 stores the problem related information regarding the problem in the storage section 338. In this case, the cause of the problem can be analyzed by acquiring the problem related information. Therefore, the cause of the problem occurring in the lighting control device 3 can be easily specified.

The driving information setting section 3351 stores the driving information based on the driving state of the lighting control device 3, which has been detected by the detection unit 32 within a predetermined period until the determination section 333 determines that a problem has occurred, in the storage section 338 as the problem related information. In this case, the driving state of the lighting control device 3 when a problem occurs can be checked by referring to the driving information. Therefore, the cause of the problem occurring in the lighting control device 3 can be easily specified.

When the determination section 333 determines that a problem has occurred, the cause specifying section 334 specifies the cause of the problem on the basis of the driving state of the lighting control device 3 detected by the detection unit 32. Then, the cause information setting section 3352 stores the cause information indicating the cause and the driving information, as the problem related information, in the storage section 338 so as to be associated with each other. In this case, the cause of the problem can be checked by referring to the cause information. Therefore, a time required to specify the cause of a problem can be shortened. This configuration is especially effective when a problem which occurs is caused by an internal factor of the lighting control device 3.

The conditions of the problem determination of the determination section 333 change with the start period, rising period, and steady period of the light source lamp 211, for example. Thus, the problem determination of the determination section 333 is performed on the basis of the transition of the driving state of the lighting control device 3. Accordingly, it can be appropriately determined whether or not an event which occurs is an abnormal event.

The detection unit 32 detects the current and voltage values of the lamp power, the inside temperature of the lighting control device 3, and the input voltage of the lamp power input to the lighting control device 3. Accordingly, not only problems, such as stopping of the discharge of both electrodes, discharge of a single electrode, and overcurrent to the light source lamp 211, can be determined on the basis of the current value of the lamp power but also a poor contact problem, a problem with the age of the light source lamp 211, and the like can be determined on the basis of the voltage value of the lamp power. In addition, abnormal temperature can be determined on the basis of the inside temperature, and overvoltage and the like can also be determined on the basis of the input voltage. Therefore, the problem determination of the determination section 333 can be appropriately performed over a wide range.

When the receiving determination section 43 determines that a problem occurrence signal has been received, the information acquisition section 44 transmits a request signal to the control unit 33, acquires the problem related information, and stores it in the storage section 47. In this case, the same problem related information can be held in the control device 4 and the lighting control device 3. Therefore, backup of the problem related information can be realized.

Moreover, since the lighting control device 3 and the control device 4 are connected to each other on the basis of the asynchronous communication method using UART, the lighting control device 3 and the control device 4 can be reliably insulated from each other.

The flash memory of the storage section 47 can store the problem related information and the main body side driving information regarding problems occurring a plural number of times. In this case, even when the storage capacity of the storage section 338 is small and different problems occur a plural number of times in the lighting control device 3, the problem related information and the main body side driving information can be stored in the flash memory. Therefore, the cause of a problem can be specified more easily by analyzing the problem related information and the main body side driving information, and the cause of the problem can be easily specified even when a plurality of problems occurs simultaneously.

The information setting section 45 stores the main body side driving information based on the driving state of the projector 1, which has been detected by the detection device 8 within a predetermined period until a problem occurrence signal is received, in the storage section 47 so as to be associated with the problem related information acquired by the information acquisition section 44. In this case, the driving state of the entire projector 1 when a problem occurs can be easily checked by referring to the problem related information and the main body side driving information. Therefore, the essential cause of a problem can be easily specified, and the information which is useful for the design of the projector 1 can also be obtained.

The transmission section 46 transmits the problem related information and the main body side driving information, which are stored in the storage section 47, to the external apparatus 12 connected to the transceiver 5. In this case, since the information can be easily extracted from the projector 1, a problem which occurs can be analyzed more easily.

In addition, since the report image including the problem related information and the main body side driving information is displayed by the image processing section 42 and the display device 2, the problem related information and the main body side driving information can be easily acquired.

Modifications of the Embodiment

The invention is not limited to the embodiments described above, but various modifications or improvements may be made without departing from the scope and spirit of the invention.

In the embodiment described above, the driving information based on the driving state of the lighting control device 3, which is detected by the detection unit 32 within a predetermined period until it is determined that a problem has occurred, and the cause information, which is stored so as to be associated with the driving information and which indicates the cause of the problem, have been exemplified as the problem related information. However, the invention is not limited to this. That is, one of the driving information and the cause information may be stored, or other information regarding a problem which occurs may be used.

Although the driving information included in the problem related information in the above embodiment is the driving information based on the driving state of the lighting control device 3 which is detected by the detection unit 32 within a predetermined period until it is determined that a problem has occurred, the predetermined period may be appropriately set. Similarly, although the main body side driving information is the driving information based on the driving state of the projector 1 which is detected by the detection unit 8 within a predetermined period until a problem occurrence signal is received, the predetermined period may be appropriately set. That is, the driving information may be information based on the driving state detected immediately before it is determined that a problem has occurred, and the main body side driving information may be information based on the driving state detected immediately before a problem occurrence signal is received.

In the embodiment described above, the problem determination of the determination section 333 is performed on the basis of the transition of the driving state of the lighting control device 3 detected by the detection unit 32. However, the invention is not limited to this. That is, the conditions of problem determination and an object to be detected may be appropriately changed.

In addition, in the embodiment described above, the detection unit 32 detects the current and voltage values of the lamp power, the inside temperature of the lighting control device 3, and the voltage value of power input to the lighting control device 3. However, the invention is not limited to this. That is, one of these may be detected, or another object to be detected, such as the cumulative lighting time of the light source lamp 211, may be detected. In other words, as long as the determination section 333 can determine that an abnormal event occurring in the lighting control device is a problem, the conditions and objects to be detected do not matter.

In the embodiment described above, the signal transmission section 336 transmits a problem occurrence signal when the determination section 333 determines that a problem has occurred, and the information acquisition section 44 acquires the problem related information when the receiving determination section 43 determines that the problem occurrence signal has been received. However, the invention is not limited to this. That is, it is possible to adopt a configuration in which the information acquisition section periodically acquires the information stored in the storage section of the lighting control device and acquires the problem related information when the problem related information is set.

In the embodiment described above, the detection device 8 as the main body side detection unit detects the inside and outside temperatures of the projector 1, the rotation speed of each fan, and the input voltage which is applied to the power source device 6. However, the invention is not limited to this. That is, one of these may be detected, or another object to be detected may be detected. Moreover, if a projector can acquire the time, the time may also be included in the main body side driving information. In addition, not only a clock can be used as a configuration capable of acquiring the time, but also the time can be acquired by receiving a standard wave used for an atomic clock or an electric wave used for a GPS (Global Positioning System). Alternatively, the time may be acquired through an apparatus, such as a server located on the network. When the image information is received in a packet, the time information included in the header information of the packet may be acquired and used.

In the embodiment described above, when a command which requests the problem related information and the main body side driving information is received from an external apparatus, such as a PC connected to the transceiver 5, the problem related information and the main body side driving information are transmitted to the external apparatus. However, the invention is not limited to this. For example, as soon as the information acquisition section 44 and the information setting section 45 acquire the problem related information and the main body side driving information, respectively, the problem related information and the main body side driving information may be transmitted to the external apparatus connected through a network or the like.

In the embodiment described above, the display device 2 is used as the reporting unit that reports the problem related information and the main body side driving information. However, the invention is not limited to this. For example, a projector may include a display unit, which has a display region exposed to the outside, as the reporting unit or may include a sound output unit that reports the information using sound. In addition, the contents reported by these reporting units may be only the problem related information. In this case, either the driving information or the cause information may be reported.

In the embodiment described above, the projector is configured to include the display device 2, which has one light source lamp 211, and one lighting control device 3 which supplies electric power to the light source lamp 211. However, the invention is not limited to this. That is, the projector may include a plurality of light sources and a plurality of lighting control devices corresponding to the number of light sources. In this case, it is preferable that the information acquisition section which forms the control device stores the acquired problem related information and the lighting control device determined that a problem has occurred (lighting control device which transmits the problem occurrence signal) in the storage section so as to be associated with each other.

In the embodiment described above, the problem related information is stored in the storage section 338 whenever it is determined that a problem has occurred and the problem related information and the main body side driving information are stored in the storage section 47 whenever a problem occurrence signal is received. However, the invention is not limited to this. For example, when it is determined that a problem resulting from the same cause has occurred, it is possible to count the number of times the problem has occurred and to store the number of times so as to be included in the problem related information. According to such a configuration, it is possible to prevent a number of items of the problem related information regarding the same problem from being stored in the storage section 47. As a result, the storage capacity of the storage section 47 can be saved and the storage capacity can be effectively used.

In the embodiment described above, the lighting control device 3 which turns on the light source lamp 211 is adopted in the projector 1. However, the invention is not limited to this. For example, the lighting control device according to the embodiment of the invention may be adopted in an illumination device with a light source. Moreover, the light source turned on by the lighting control device according to the embodiment of the invention is not limited to the discharge type light source lamp, and may be a discharge lamp using a different lighting method or may be a solid-state light source, such as an LED (Light Emitting Diode). In addition, the projector including the lighting control device according to the embodiment of the invention may be a front type projector in which the projection direction and observation direction of an image are approximately the same and a rear type projector in which the projection direction and observation direction of an image are opposite to each other.

The invention can be used for a lighting control device which controls the lighting of a light source. In particular, the invention can be suitably used for a projector.

The present application claims priority from Japanese Patent Application No. 2009-026748 filed on Feb. 6, 2009, which is hereby incorporated by reference in its entirety.

What is claimed is:

1. A method of controlling lighting of a light source and a projector with a lighting control device connected to a control unit, the control unit controlling a lighting unit supplying electric power to the light source, the method comprising:
   forming an image light corresponding to image information by modulating light emitted from the light source;
   projecting the image light;
   detecting a driving state of the lighting control device;
   determining whether or not a problem has occurred in the lighting control device on the basis of the driving state;
   storing problem related information in the lighting control device regarding the problem when the problem has occurred;
   transmitting a problem occurrence signal from the lighting control device to the control device, which indicates that the problem has occurred, when it is determined that a problem has occurred;
   acquiring the problem related information from the lighting control device to the control device when the problem occurrence signal is received and storing the problem related information in the control device; and
   storing driving information, which is based on the driving state within a predetermined period until the problem occurs, as the problem related information.

2. The method according to claim 1, further comprising specifying a cause of the problem on the basis of the driving state when the problem has occurred; and
   storing cause information, which indicates the specified cause, as the stored problem related information.

3. The method according to claim 1, further comprising determining whether or not the problem has occurred on the basis of transition of the detected driving state.

4. The method according to claim 1, further comprising detecting at least one of current and voltage values of the electric power supplied to the light source, inside temperature, and a voltage value of electric power input to the lighting control device.

5. The method according to claim 1, further comprising:
   detecting a driving state of the projector within a predetermined period until the problem occurrence signal is received so as to be associated with the acquired problem related information when the problem occurrence signal is received; and
   storing main body side driving information based on the driving state of the projector.

6. The method according to claim 1, further comprising transmitting the acquired problem related information to an external apparatus connected to the projector.

7. The method according to claim 1, further comprising reporting the acquired problem related information.

8. The method according to claim 1, wherein conditions of problem determination are changed according to a condition of the light source.

9. The method of claim 1, further comprising turning off the light source when it is determined that a problem has occurred.

10. The method according to claim 1, further comprising transmitting a request signal from the control device to the lighting control device to request the problem related information.

11. The method according to claim 4, further comprising detecting a cumulative lighting time of the light source.

12. The method according to claim 1, wherein the control device periodically acquires the problem related information stored in the lighting control device, when the problem related information is set.

13. The method according to claim 1, further comprising counting the number of times the problem has occurred and storing the number of times the problem has occurred so as to be included in the problem related information, when it is determined that a problem has occurred.

14. The method according to claim 2, wherein the cause of the problem is specified when a single electrode discharge state continues for at least 10 seconds in a steady state.

15. The method according to claim 7, wherein the problem related information is reported using sound.

16. The method according to claim 1, further comprising reporting driving information and cause information.

17. The method according to claim 1, further comprising transmitting the problem related information stored in the lighting control device to the control device.

* * * * *